(12) United States Patent
Teshima

(10) Patent No.: US 12,277,745 B2
(45) Date of Patent: Apr. 15, 2025

(54) IMAGE SEARCHING APPARATUS, CLASSIFIER TRAINING METHOD, AND RECORDING MEDIUM

(71) Applicant: CASIO COMPUTER CO., LTD., Tokyo (JP)

(72) Inventor: Yoshihiro Teshima, Higashimurayama (JP)

(73) Assignee: CASIO COMPUTER CO., LTD., Tokyo (JP)

(*) Notice: Subject to any disclaimer, the term of this patent is extended or adjusted under 35 U.S.C. 154(b) by 468 days.

(21) Appl. No.: 17/569,598

(22) Filed: Jan. 6, 2022

(65) Prior Publication Data
US 2022/0129702 A1    Apr. 28, 2022

Related U.S. Application Data

(62) Division of application No. 16/741,795, filed on Jan. 14, 2020, now Pat. No. 11,250,295.

(30) Foreign Application Priority Data

Jan. 24, 2019   (JP) ................. 2019-010257
Dec. 2, 2019    (JP) ................. 2019-217687

(51) Int. Cl.
*G06V 10/44*       (2022.01)
*G06F 18/214*      (2023.01)
(Continued)

(52) U.S. Cl.
CPC .......... *G06V 10/454* (2022.01); *G06F 18/214* (2023.01); *G06F 18/22* (2023.01);
(Continued)

(58) Field of Classification Search
CPC .. G06F 18/22; G06F 18/2411; G06F 18/2413; G06F 18/214; G06N 3/08;
(Continued)

(56) References Cited

U.S. PATENT DOCUMENTS 8,929,649 B2   1/2015  Teshima
8,988,745 B2   3/2015  Hamada et al.
(Continued)

FOREIGN PATENT DOCUMENTS

| CN | 110163090 B | * | 8/2023 | ......... G06K 9/00771 |
| JP | 2007279942 A |   | 10/2007 | |
| JP | 2016139176 A |   | 8/2016 | |

OTHER PUBLICATIONS

European Office Action dated Apr. 29, 2022, issued in European Application No. 20152903.9.
(Continued)

*Primary Examiner* — Pinalben Patel
(74) *Attorney, Agent, or Firm* — Holtz, Holtz & Volek PC

(57) ABSTRACT

A training apparatus includes a processor which acquires an image to which identification information of a subject included in the image is attached as a first correct label the image being included in an image dataset for training and being an image for use in supervised training. The processor further attaches, to the acquired image, classification information based on a feature amount of the acquired image as a second correct label, trains a classifier using the acquired image and the second correct label attached thereto, and updates training content used in the training using the acquired image and the first correct label after training the classifier.

6 Claims, 9 Drawing Sheets

(51) Int. Cl.
*G06F 18/22* (2023.01)
*G06F 18/2411* (2023.01)
*G06F 18/2413* (2023.01)
*G06N 3/08* (2023.01)
*G06V 10/46* (2022.01)
*G06V 10/762* (2022.01)
*G06V 10/764* (2022.01)
*G06V 10/82* (2022.01)

(52) U.S. Cl.
CPC ...... *G06F 18/2411* (2023.01); *G06F 18/2413* (2023.01); *G06N 3/08* (2013.01); *G06V 10/464* (2022.01); *G06V 10/762* (2022.01); *G06V 10/764* (2022.01); *G06V 10/82* (2022.01)

(58) Field of Classification Search
CPC .. G06V 10/454; G06V 10/464; G06V 10/762; G06V 10/82; G06V 10/764
See application file for complete search history.

(56) References Cited

U.S. PATENT DOCUMENTS

| | | | |
|---|---|---|---|
| 9,002,061 | B2 | 4/2015 | Hashimoto et al. |
| 9,092,669 | B2 | 7/2015 | Hamada et al. |
| 9,196,029 | B2 | 11/2015 | Teshima |
| 9,743,740 | B2 | 8/2017 | Teshima |
| 9,943,154 | B2 | 4/2018 | Teshima et al. |
| 10,025,950 | B1 | 7/2018 | Avasarala et al. |
| 10,311,323 | B2 | 6/2019 | Teshima et al. |
| 10,496,884 | B1 | 12/2019 | Nguyen et al. |
| 10,977,827 | B2 | 4/2021 | Mauchly et al. |
| 11,775,875 | B2 * | 10/2023 | Zhang .................. G06V 10/56 382/159 |
| 2012/0237186 | A1 | 9/2012 | Makino et al. |
| 2013/0077869 | A1 | 3/2013 | Teshima et al. |
| 2016/0026900 | A1 | 1/2016 | Ando |
| 2016/0210532 | A1 | 7/2016 | Soldevila et al. |
| 2016/0217349 | A1 * | 7/2016 | Hua .................. G06N 20/00 |
| 2016/0239654 | A1 | 8/2016 | Johri et al. |
| 2018/0247113 | A1 * | 8/2018 | Yang .................. G06N 3/08 |
| 2018/0292825 | A1 | 10/2018 | Smolyanskiy et al. |
| 2019/0232964 | A1 * | 8/2019 | Lindholm ............ G06V 10/764 |
| 2020/0034782 | A1 | 1/2020 | Hsieh et al. |
| 2020/0082508 | A1 | 3/2020 | Alletto et al. |
| 2020/0234068 | A1 | 7/2020 | Zhang et al. |
| 2023/0334332 | A1 * | 10/2023 | Wu .................. G06V 10/761 |

OTHER PUBLICATIONS

Chen, et al., "Deep Learning for Instance Retrieval: A Survey", arxiv.org, Cornell University Library, 2022.
Wan, et al., "Deep Learning for Content-Based Image Retrieval:A Comprehensive Study", Multimedia, ACM, 2 Penn Plaza, Suite 701 New York NY 10121-0701 USA, Nov. 3, 2014 (Nov. 3, 2014), pp. 157-166.
European Office Action dated Feb. 13, 2024, issued in European Application No. 20152903.9.
Caron, et al., "Deep Clustering for Unsupervised Learning of Visual Features", arxiv.org, Cornell University Library, 201 Olin Library Cornell University Ithaca, NY, Jul. 15, 2018.
Lin, et al., "DeepHash: Getting Regularization, Depth and Fine-Tuning Right", arxiv.org, Cornell University Library, 201 Olin Library Cornell University Ithaca, NY 14853, Jan. 20, 2015.
Wan, et al., "Deep Learning for Content-Based Image:A Comprehensive Study", Multimedia, ACM, 2 Penn Plaza, Suite 701 New York NY 10121-0701 USA, Nov. 3, 2014 (Nov. 3, 2014), pp. 157-166.
Chen Tao et al: "SS-HCNN: Semi-Supervised Hierarchical Convolutional Neural Network for Image Classification,", IEEE Transactions on Image Processing, IEEE Service Center, Piscataway, NJ, US, vol. 28, No. 5, Dec. 14, 2018 (Dec. 14, 2018), pp. 2389-2398, XP011707341, ISSN: 1057-7149, DOI: 10.1109/TIP.2018.2886758 [retrieved on Jan. 30, 2019].
Extended European Search Report (EESR) dated Aug. 5, 2020 issued in European U.S. Appl. No. 16/741,795 (which is a European counterpart of parent U.S. Appl. No. 16/741,795).
Japanese Office Action (and English language translation thereof) dated Nov. 24, 2021, issued in counterpart Japanese Application No. 2019-217687 (which is a Japanese counterpart of parent U.S. Appl. No. 16/741,795).
Notice of Allowance dated Oct. 20, 2021 issued in parent U.S. Appl. No. 16/741,795.
Office Action (Non-Final Rejection) dated May 11, 2021, issued in parent U.S. Appl. No. 16/741,795.
Hoffer, et al., "Deep Metric Learning Using Triplet Network", URL: https: //arxiv.org/pdf/1412.6622.pdf, Dec. 4, 2018.

* cited by examiner

CNN CONFIGURATION OVERVIEW

IMAGE SEARCHING APPARATUS, CLASSIFIER TRAINING METHOD, AND RECORDING MEDIUM

CROSS-REFERENCE TO RELATED APPLICATION

This application is a Divisional Application of U.S. application Ser. No. 16/741,795, filed on Jan. 14, 2020, and issued as U.S. Pat. No. 11,250,295, on Feb. 15, 2022, which claims the benefit of Japanese Patent Application No. 2019-010257, filed on Jan. 24, 2019, and Japanese Patent Application No. 2019-217687, filed on Dec. 2, 2019, the entire disclosures of all of which are incorporated by reference herein.

FIELD

This application relates generally to an image searching apparatus, a classifier training method, and a recording medium.

BACKGROUND

Techniques have been developed for classifying images into predetermined classes by using a convolutional neural network (CNN)-based classifier. For example, with use of such a technique, an image (dermoscopic image) of a skin-disease affected area, taken by a device such as a dermatoscope, is classified into a class for which a disease name is defined, and thus the skin disease name of the affected area can be presumed. When doing so, often is the case that it is more convenient to display the images in a ranked manner in accordance with the degree of similarity of the classes, instead of merely classifying the images. For example, "Deep Metric Learning Using Triplet Network", [online], Dec. 4, 2018, [Searched Jan. 8, 2019] on the Internet (URL: https://arxiv.org/pdf/1412.6622.pdf), authored by Elad Hoffer and Nir Ailon, discloses a training method for parameters that create features where classes that are the same are made to have short distances therebetween, whereas classes that are different from each other are made to have long distances therebetween. In doing so, image searching system can be created where images that are of the same class are given a high ranking and images of different classes are given a low ranking.

SUMMARY

An image searching apparatus includes:
a processor; and
a memory configured to store a program to be executed by the processor,
wherein the processor is configured to
attach, to an image with a first correct label attached thereto, a second correct label, the first correct label being a correct label attached to each image included in an image dataset for training for use in supervised training, the second correct label being a correct label based on a degree of similarity from a predetermined standpoint,
execute main training processing to train a classifier by using (i) the images to which the first correct label is attached or the first correct label and the second correct label are attached and (ii) the attached first correct label or one of the attached first correct label and the attached second correct label,
fine-tune a training state of the classifier, trained by the main training processing, by using (i) the images to which the first correct label and the second correct label are attached and (ii) the other one of the attached first correct label and the attached second correct label, and search, by using the classifier that is fine-tuned, for images similar to a query image received from a user.

BRIEF DESCRIPTION OF THE DRAWINGS

A more complete understanding of this application can be obtained when the following detailed description is considered in conjunction with the following drawings, in which.

DETAILED DESCRIPTION

An image searching apparatus and the like according to embodiments of the present disclosure are described below with reference to the drawings. Through the drawings, components that are the same or equivalent are assigned the same reference signs.

Embodiment 1

An image searching apparatus 100 according to Embodiment 1 of the present disclosure uses a CNN classifier, trained by supervised learning (supervised training) with use of a training image dataset (collection of image data for training), to search, from an image dataset for searching (collection of image data that is to be searched), for images that are similar to an image (query image) given by a user. The image dataset for training and the image dataset for searching may be completely different sets of data. A portion or all of the image data included the image dataset for training (for searching) may be included in the image dataset for searching (for training).

Each image data (image data for training) included in the image dataset for training is attached with, as a correct label, a correct response to the image data as given, that is, an output value that ought to be outputted from the CNN classifier when the image data is inputted into the CNN classifier. Typically, the correct label is a designation indicating the subject that appears in the image of the image data to which the correct label is attached. For example, in a case where an image searching apparatus 100 is to perform a search of images of skin-disease affected areas, the image data for training are image data showing affected areas whose skin disease names are identified and each individual image data for training is attached with a disease name of the affected area shown in the image as a correct label. Also, in a case where the image searching apparatus 100 is to perform a search of images of flowers, the image data for training are image data showing flowers whose names are identified and each individual image data for training is attached with a name of the flower shown in the image as a correct label.

A label attacher 13, which is described further below, clusters image data for training based on the degree of similarity in appearance and attaches, to the image data, a correct label corresponding to the cluster to which each of the image data for training belongs. This correct label is different from the correct label originally attached to the image data for training. Thus, for distinction between the two below, the correct label that is originally attached to the image data for training is referred to as the first correct label whereas the correct label that the label attacher 13 attaches to the image data for training is referred to as the second correct label.

Figure 1:
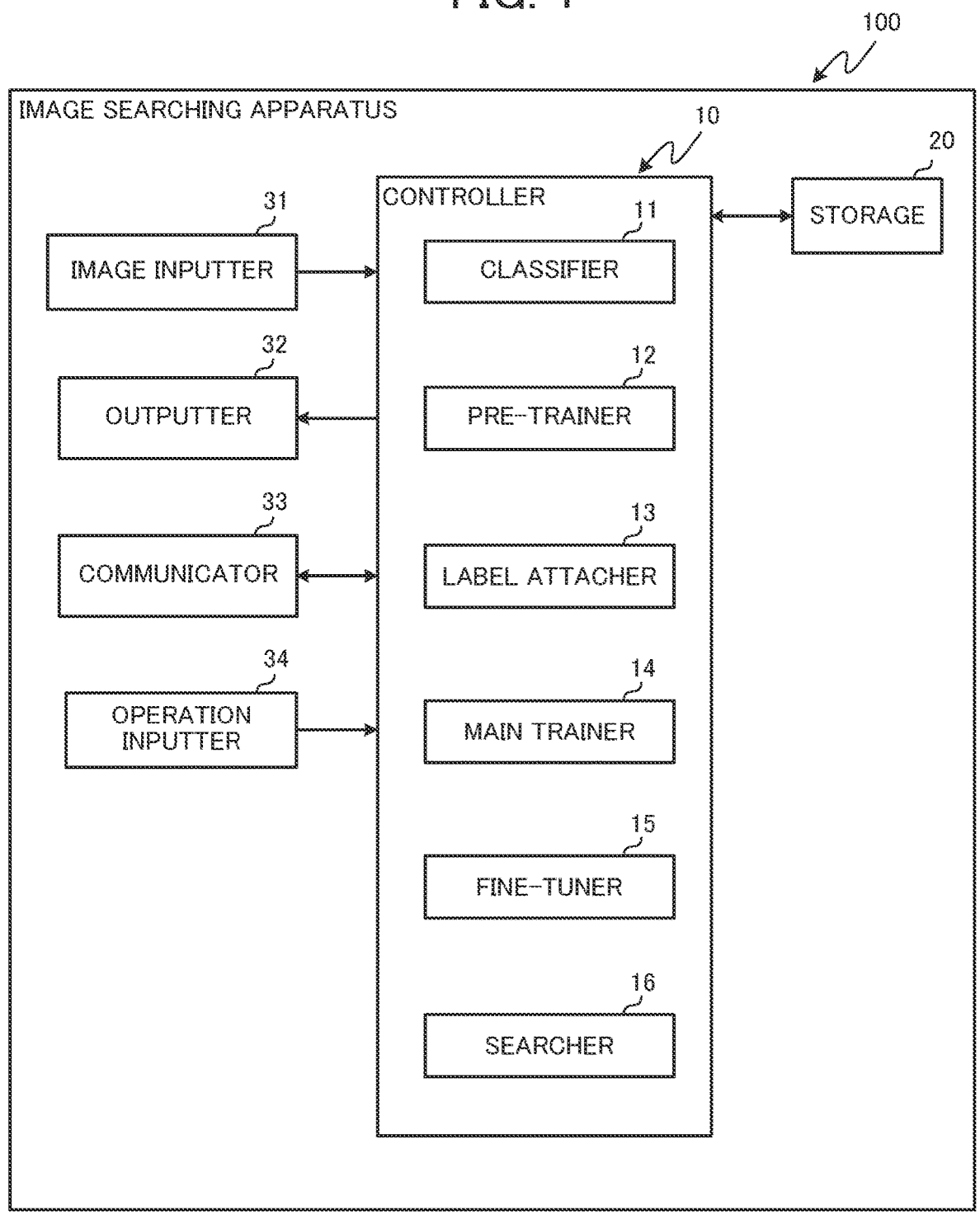
FIG. 1 is a diagram illustrating a functional configuration of an image searching apparatus according to Embodiment 1.

The image searching apparatus 100 according to Embodiment 1, as illustrated in FIG. 1, includes a controller 10, a storage 20, an image inputter 31, an outputter 32, a communicator 33, and an operation inputter 34.

The controller 10 includes, for example, a central processing unit (CPU), and executes programs stored in the storage 20 to achieve the functions of individual components (a classifier 11, a pre-trainer 12, a label attacher 13, a main trainer 14, a fine-tuner 15, and a searcher 16), which are described further below.

The storage 20 includes a read-only memory (ROM), a random access memory (RAM), and the like, and stores programs to be executed by the CPU of the controller 10 and necessary data. The storage 20 also stores image data (image data for training) to be used for training of the classifier 11 and image data to be subjected to image searching (image data for searching). The image searching apparatus 100 may be set to acquire either a portion or all of the image data for training and the image data for searching from the communicator 33.

The image inputter 31 is a device for inputting image data for training, image data for searching, and image data of (unknown) images to be searched for which are provided by a user. The controller 10 acquires image data via the image inputter 31. Any device may be used as the image inputter 31 as long as the controller 10 is capable of acquiring image data. For example, in a case where the image data is stored beforehand in the storage 20 and the controller 10 acquires image data by accessing the storage 20, the storage 20 may also serve as the image inputter 31. Also, in a case where the controller 10 acquires the image data externally from a server or the like via the communicator 33, the communicator 33 also serves as the image inputter 31.

The outputter 32 is a device for the controller 10 to output an image search result and the like. The outputter 32 may be a liquid crystal display or an organic electroluminescent (EL) display, for example. The image searching apparatus 100 may include one of these displays as the outputter 32 or may include the outputter 32 as an interface for connecting to an external display. In a case where the outputter 32 is included as an interface, the image searching apparatus 100 displays the image search results and the like onto an external display that is connected with the image searching apparatus 100 via the outputter 32.

The communicator 33 is a device (network interface, for example) for transmitting and receiving data to and from another external device (server storing a database of image data, for example). The controller 10 is capable of acquiring image data via the communicator 33.

The operation inputter 34 receives operation inputs, made by a user, directed at the image searching apparatus 100. Examples of the operation inputter 34 include a keyboard, a mouse, a touch panel, and the like. The image searching apparatus 100 receives an instruction or the like from the user via the operation inputter 34.

Next, the functions of the controller 10 are described. The controller 10 achieves the functions of the classifier 11, the pre-trainer 12, the label attacher 13, the main trainer 14, the fine-tuner 15, and the searcher 16.

The classifier 11 is a convolutional neural network (CNN)-based classifier of images. The controller 10 functions as the classifier 11 by using the controller 10 executing the program that realizes the CNN-based classifier. The classifier 11 includes an input layer into which the input image is to be input via the image inputter 31, an output layer from which a classification result of the input image is to be output, and an intermediate layer that is a layer other than the input layer and the output layer. The classifier 11 outputs the result obtained by classifying the input image. In a case where the classifier 11 is to be trained, the image for training is inputted into the input layer as an input image whereas in a case where the trained classifier 11 is used for classifying an unknown image, the unknown image is inputted into the input layer as the input image. An overview of a configuration of the classifier 11 is described further below.

The pre-trainer 12 pre-trains the CNN of the classifier 11 before the main trainer 14 trains the CNN of the classifier 11. The training of the CNN of classifier 11 that takes place before training by the main trainer 14 is referred to as pre-training. Also, the pre-trainer 12 performs pre-training by using a dataset (ImageNet, for example) for general image recognition. In a case where an enormous amount of image data (for example, image data of an affected area to which a name of a skin disease is attached as the correct label (first correct label)) included in the image dataset for training can be prepared, this pre-training is unnecessary. In such a case, the pre-trainer 12 is also unnecessary. In a case where the amount of image data included in the image dataset for training is small, usage of just the image dataset for training will result in inadequate training of the CNN. However, if the CNN is pre-trained using the enormous amount of image data included in a dataset for general image recognition (dataset for pre-training), the CNN can be trained thereafter with a relatively small amount of image data for training. When pre-training is to be performed, the pre-trainer 12 sets, in advance, the number of classes (number of dimensions of the output vector) to be output by the output layer 118 of the CNN of the classifier 11 to match with the number of classes (512, for example) to be used with the dataset for pre-training. Then, the pre-trainer 12 pre-trains the CNN of the classifier 11 by updating the weight coefficients in the CNN of the classifier 11, through use of the backpropagation approach, based on the difference (error) between (i) the output value that is output from the output layer 118 when the image data for pre-training included in the dataset for pre-training is inputted into the input layer 111 of the CNN and (ii) the correct label is attached to the image data for the pre-training. The weight coefficient is a coefficient defining the strength of the interconnection between layers in the CNN.

The label attacher 13 attaches, to each of the image data for training, a second correct label that is a correct label based on the degree of similarity in appearance of the images. Specifically, the label attacher 13 clusters (multiple clusters, each of which is assigned a number) the image data for training based on feature amounts into which the appearance of the images are reflected. The label attacher 13 attaches to the images, as the second correct label, the number assigned to the cluster to which the feature amount of each image belongs. Examples of the feature amounts into which the appearance of the images are reflected include the Bag of Visual Words (BoVW). The BoVW is a feature amount obtained based on the arrangement state of feature points (distinct areas such as edges or corners in an image) included in the image, meaning that images with a high degree of similarity of the BoVW with one another are similar in appearance. Therefore, by using the second correct label as described, the images that are similar to one another in appearance get classified into a single cluster.

The main trainer 14 trains the CNN of the classifier 11 using image data for training with the second correct labels attached by the label attacher 13. When this training (main training) is to be performed, the main trainer 14 sets, in advance, the number of classes (number of dimensions of the output vector) to be output by the output layer 118 of CNN of the classifier 11 to match with the aforementioned number of clusters (number of classes in the main training; 32 for example) used when the label attacher 13 attached the second correct labels. Then, the main trainer 14 trains the CNN of the classifier 11 by updating the weight coefficients in the CNN of the classifier 11 through use of the backpropagation approach, based on the error between (i) the output values that are output from the output layer 118 when the image data for training is inputted into the input layer 111 and (ii) the second correct label.

The fine-tuner 15 uses the image data for training to which the first correct label is attached to fine-tune the training state (weight coefficients in the CNN) of the CNN of the classifier 11 trained by the main trainer 14. This fine-tuning, which is described further below, is performed by degree-of-similarity training with use of a triplet network. Also, when searching for images similar to an input image fed to the classifier 11, it is necessary to output from the output layer 118 of the CNN of the classifier 11, as the classification result, a feature vector that is to be used for image searching. Therefore, when this fine-tuning is to be performed, the fine-tuner 15 sets, in advance, the number of dimensions of the output vector to be output by the output layer 118 of the CNN of the classifier 11 to match with the number of dimensions of the feature vector (256 dimensions, for example) to be used for similar image searching.

The searcher 16 searches, based on the value of the output vector output by the CNN of the classifier 11 fine-tuned by the fine-tuner 15, for images similar to the query image ((unknown) image, inputted via the image inputter 31 by the user, for which a search is performed by the image searching apparatus 100).

The functional configuration of the image searching apparatus 100 is described above. An overview of the CNN is described next. The CNN is an artificial neural network that imitates nerve cell activity in the human visual cortex and it was developed based on the neocognitron. The CNN, unlike general feedforward neural networks, is composed not only of a fully-connected layer but also a convolutional layer and a pooling layer, both serving as intermediate layers. As such, the features of the input image are extracted at the intermediate layers. Also, the classification result of the input image is probabilistically expressed in the output layer. A typical configuration overview of the CNN that is to perform N-class classification is described with reference to FIG. 2.

Figure 2:
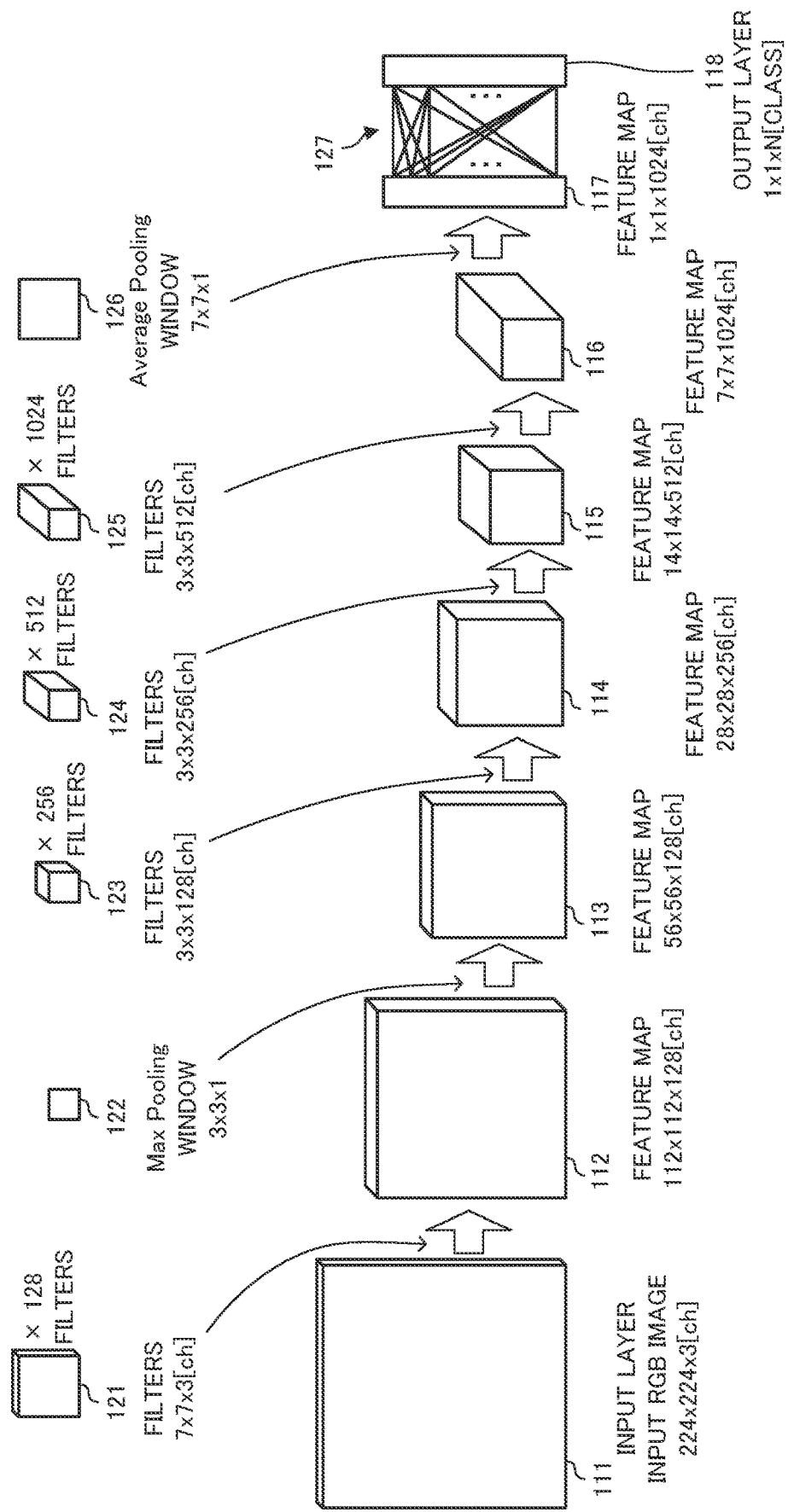
FIG. 2 is a diagram demonstrating a configuration overview of a convolutional neural network (CNN)

As illustrated in FIG. 2, the CNN that is to perform N-class classification performs convolutional processing (scanning with filters) and pooling processing (scanning with windows) with respect to the input layer 111 into which an input image is inputted, calculating gradually smaller feature maps 112, 113, 114, 115, 116, and 117, and ultimately obtains, from the output layer 118, an N-dimensional output vector. In the example illustrated in FIG. 2, the gradually smaller feature maps are calculated with respect to an inputted input image, by scanning at strides of 2, lengthwise and widthwise, with filters 121, 123, 124, and 125 for convolutional processing and by scanning at strides of 2, lengthwise and widthwise, with the windows 122 and 126 for pooling processing, and ultimately the output is obtained. The "scanning at strides of 2" means that scanning is performed by shifting two pixels or two elements included in the feature map, at a time.

Each of the elements in filters 121, 123, 124, and 125 are assigned a corresponding weight coefficient. By scanning the input image or a feature map, each having a same number of channels as the corresponding filter, in a planar direction, a scalar value dot product result is outputted for each of the salient points in the input image or the feature map, and thus a new feature map is obtained. Also, by applying multiple filters (n filters), a feature map of that many filters (n channels) is obtained. Also, after an iteration of scanning at strides of 2, the size of the feature map gets reduced by half, lengthwise and widthwise. The result is that as scanning proceeds downstream, the more global the feature extraction becomes (filter size enlarges relative to the size of the feature map).

In the example of FIG. 2, the final layer (feature map 117) of the intermediate layers and the output layer 118 of the CNN are connected together by a fully-connected connections 127 assigned with weight coefficients, and the weighting and adding is performed in a manner similar to that of a typical neural network. Since the final layer of the intermediate layer of the CNN is connected to the output layer 118 by the fully-connected connections 127, it is also referred to as the fully-connected layer. In this example, since N-class classification is performed, the output layer 118 has N elements (or neurons), and thus the magnitude of the probability of the inferred classification expresses the magnitude of the value of a particular element.

In the CNN, the weight coefficient assigned to each connection of the fully-connected connections 127 and the weight coefficients of the aforementioned filters 121, 123, 124, and 125 can be acquired by using the training data prepared in advance. Specifically, first, the training data is inputted into the input layer 111 as an input image and is forward-propagated through to the output layer 118 from which an output result is then obtained. Then, the difference (error) between the output result and the correct answer (correct label attached to the inputted training data) is obtained and the weight coefficient is updated in the error-reducing direction by using the backpropagation approach. The value of the weight coefficient is caused to converge to an appropriate value, by repeatedly performing this operation while reducing the training rate (update amount of the weight coefficient in the backpropagation approach).

After each of the weight coefficients of the CNN are trained by the training data, the unknown image data is forward-propagated as the input image data to obtain, from the output layer 118, an output result being an inference value of the classification of the input value. In a typical CNN, although the number of elements of the output layer 118 (number of dimensions of the output vector) is a predetermined value (N in the example of FIG. 2) set to match with the number of classes for classification, the output layer 118 and the preceding the fully-connected connections 127 may be changed in the image searching apparatus 100 in accordance with the training type (pre-training, main training, or fine-tuning), as described below.

Figure 3:
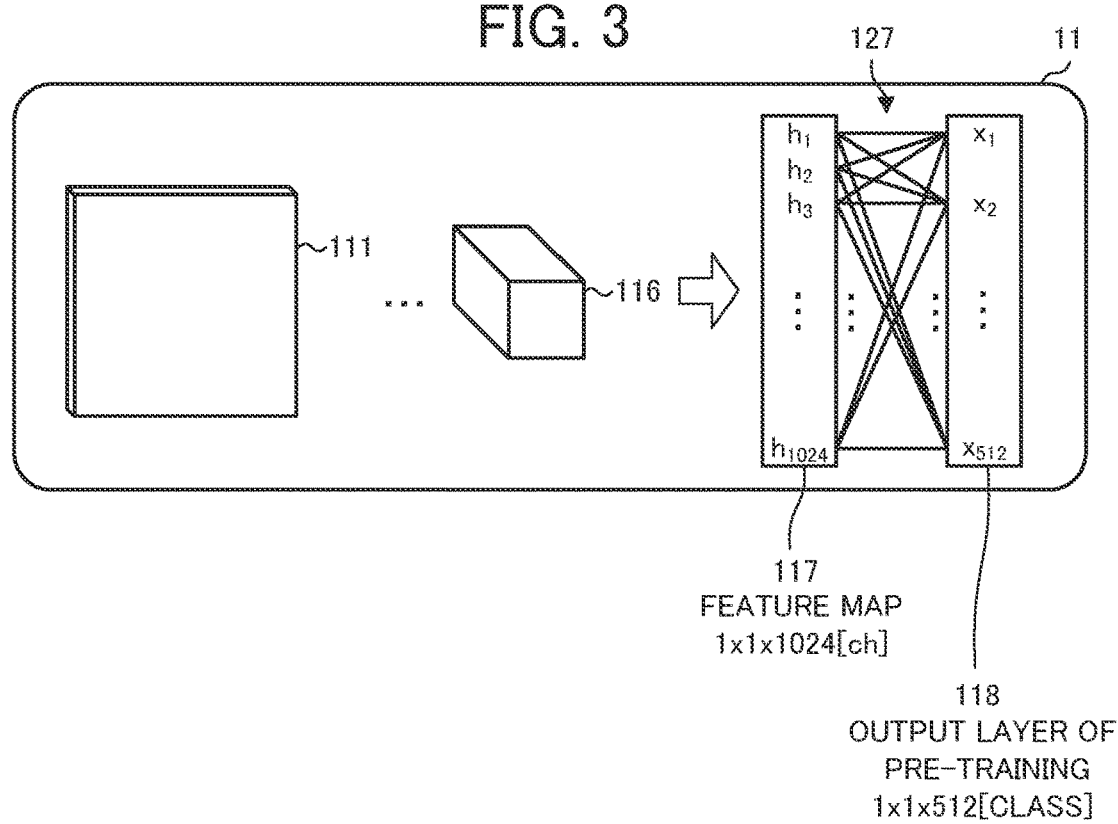
FIG. 3 is a diagram demonstrating an example of CNN during pre-training according to Embodiment 1.

In pre-training, the number of elements of the output layer 118 is set to be equal to the number of classes that are used by the data for pre-training. For example, if the number of classes to be used by the data for pre-training is 512, the CNN is trained with the number of elements of the output layer 118 of the CNN during pre-training set to 512 as illustrated in FIG. 3.

Figure 4:
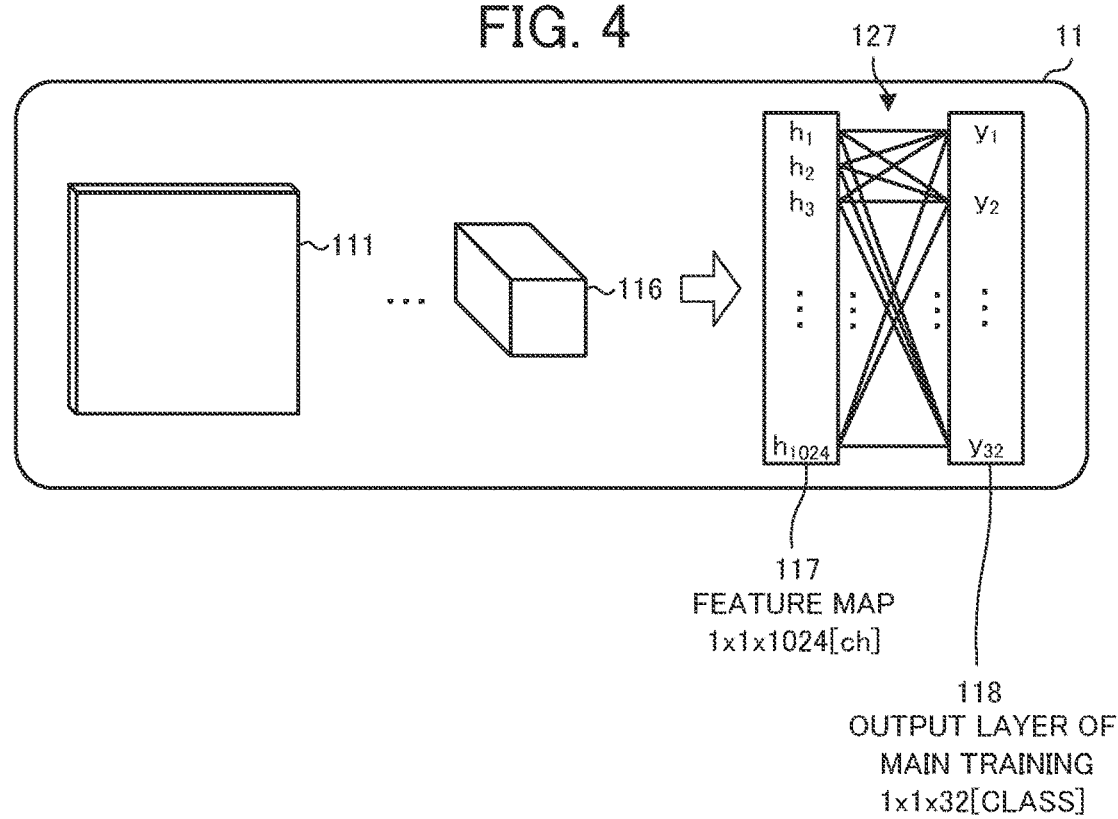
FIG. 4 is a diagram demonstrating an example of the CNN during main training according to Embodiment 1.

Then, in main training, the number of elements of the output layer 118 is set to the number of clusters used at the time of attaching of the second correct labels by the label attacher 13. For example, if the number of these clusters is 32, then the CNN is trained with the number of elements of the output layer 118 of the CNN during main training set to 32 as illustrated in FIG. 4. At this time, since the post-training weight coefficients from the input layer 111 up to the feature map 117 of the CNN that was trained in pre-training are used as is, the CNN is trained with only the fully-connected connections 127 and the output layer 118 changed for main training. In other words, the weight coefficients of the fully-connected connections 127 are updated based on the error between the second correct label and the output layer 118.

Figure 5:
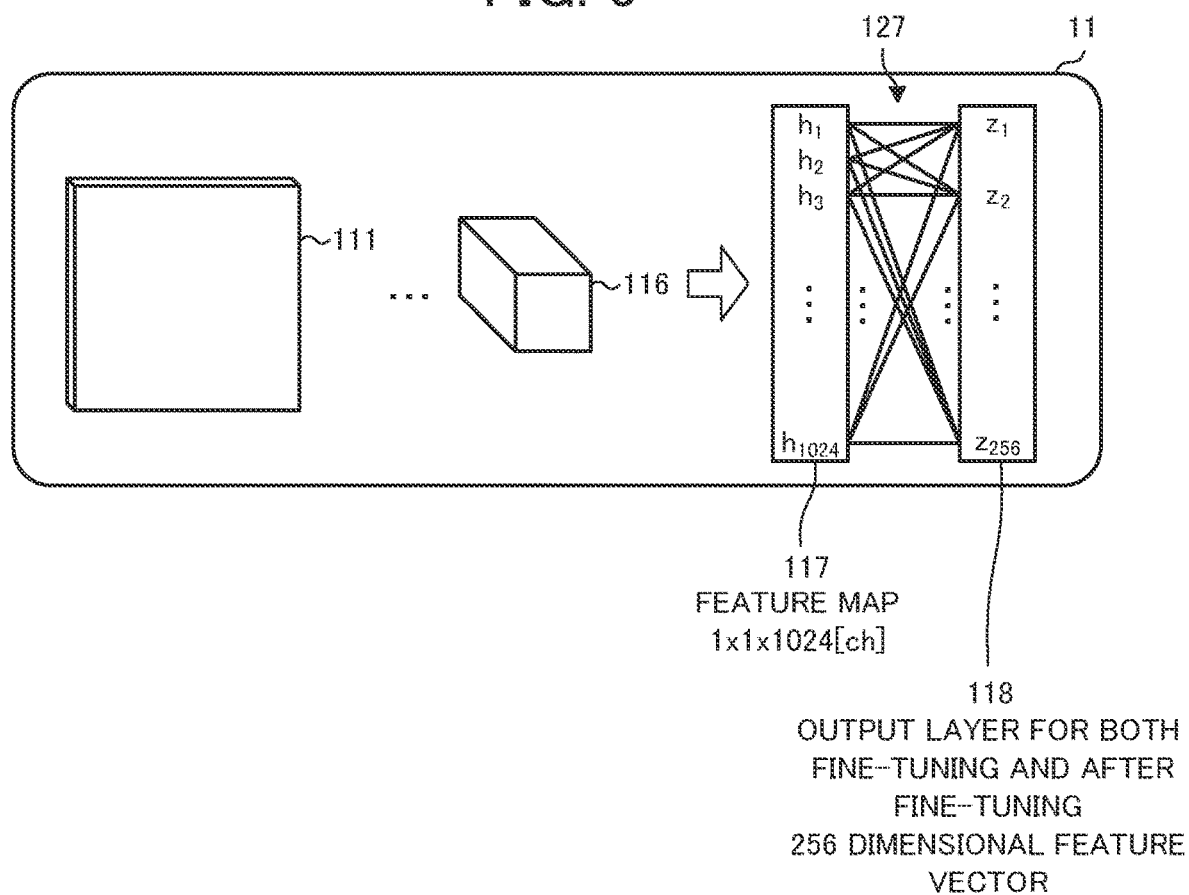
FIG. 5 is a diagram demonstrating an example of the CNN both during and after fine-tuning according to Embodiment 1.

Then, in fine-tuning, the number of elements of the output layer 118 are set to be equal to the number of dimensions of the feature vector used thereafter during image searching. For example, if the number of dimensions of the feature vector is set to 256 as illustrated in FIG. 5, then the CNN is trained with the number of elements of the output layer 118 of the CNN during fine-tuning set to 256. At this time, since the post-training weight coefficients from the input layer 111 up to the feature map 117 of the CNN that was trained in pre-training and main-training are used as is, the CNN is trained with only the fully-connected connections 127 and the output layer 118 changed for fine-tuning. During this fine-tuning based on the backpropagation approach using the loss L, which is described further below, the loss L is regarded as an error, and the weight coefficients in only the layer (fully-connected connections 127, for example) near the output layer 118 of the CNN are updated such that the value of loss L becomes smaller. By performing fine-tuning in this manner, the post-training weight coefficients in the CNN can be utilized as is and the weight coefficients that have a great influence on the output value of the output layer 118 can be efficiently updated. Normally, Softmax processing is performed with respect to the output of the CNN, but in the image searching apparatus 100, Softmax processing is unnecessary because the output value of the output layer 118 after fine-tuning is handled as the value of the feature vector. Since the information held by the feature vector can be handled as is without the use of Softmax processing, there is a high possibility that a more suitable image search can be performed.

Figure 6:
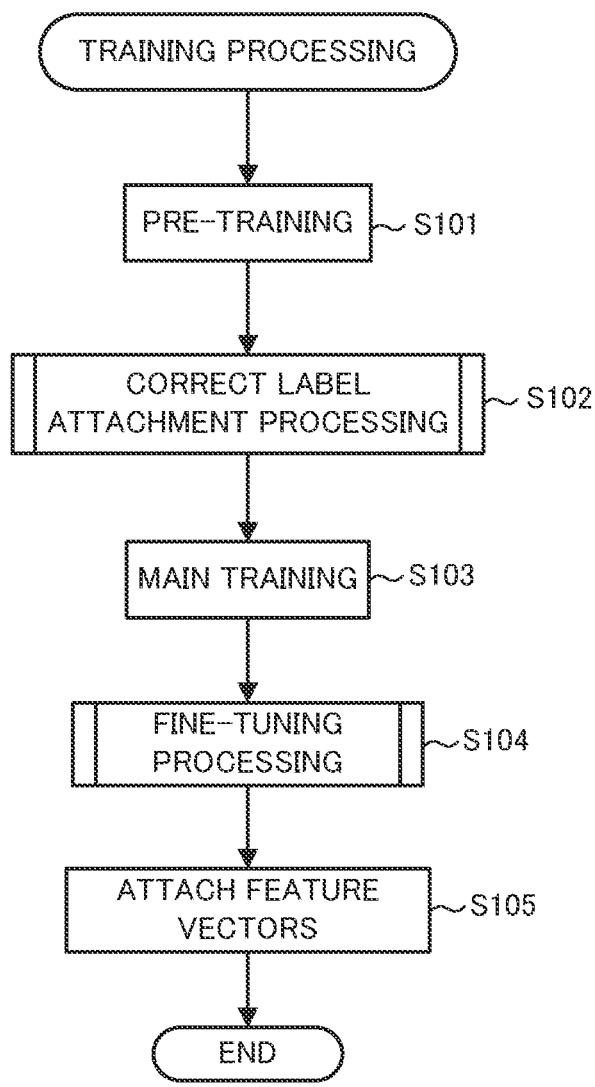
FIG. 6 is a flowchart of training processing according to Embodiment 1.

The overview of the CNN that is included in the classifier 11 of the image searching apparatus 100 is described above. Next, the training processing that is performed by image searching apparatus 100 is described with reference to FIG. 6. This training processing starts when the image searching apparatus 100 receives an instruction from the user via the operation inputter 34 to start the training processing.

First, the pre-trainer 12 acquires, via the communicator 33, a dataset for general image recognition such as ImageNet, and trains the CNN of the classifier 11 using this dataset for general image recognition (step S101).

Next, the label attacher 13 attaches to each of the image data (image data for training) included in the image dataset for training, the second correct label based on the degree of similarity in appearance of the images (step S102). This processing (correct label attachment processing) is described further below with reference to FIG. 7. The step S102 is also referred to as the label attaching step.

Next, the main trainer 14 trains the CNN of the classifier 11 based on the image data included in the image dataset for training and the second correct label attached by the label attacher 13 to the image data (step S103). That is, the main trainer 14 updates the weight coefficients in the CNN of the classifier 11 through use of the backpropagation approach, based on the error between (i) the output values obtained by inputting the image data into the classifier 11 and (ii) the second correct label. The step S103 is also referred to as the main training step.

Next, the fine-tuner 15 performs processing of fine-tuning (fine-tuning processing) with use of the image data for training to fine-tune the training state of the CNN of the classifier 11 trained by the main trainer 14 (step S104). The fine-tuning processing is described further below with reference to FIG. 8. The step S104 is also referred to as the fine-tuning step.

Next, the searcher 16 performs processing of attaching the feature vector, obtained from the output layer 118 by inputting image data included in the image dataset for searching into the CNN of the classifier 11, to the corresponding image data, for all of the image data included in the image dataset for searching (step S105). The training processing ends upon completion of this.

Figure 7:
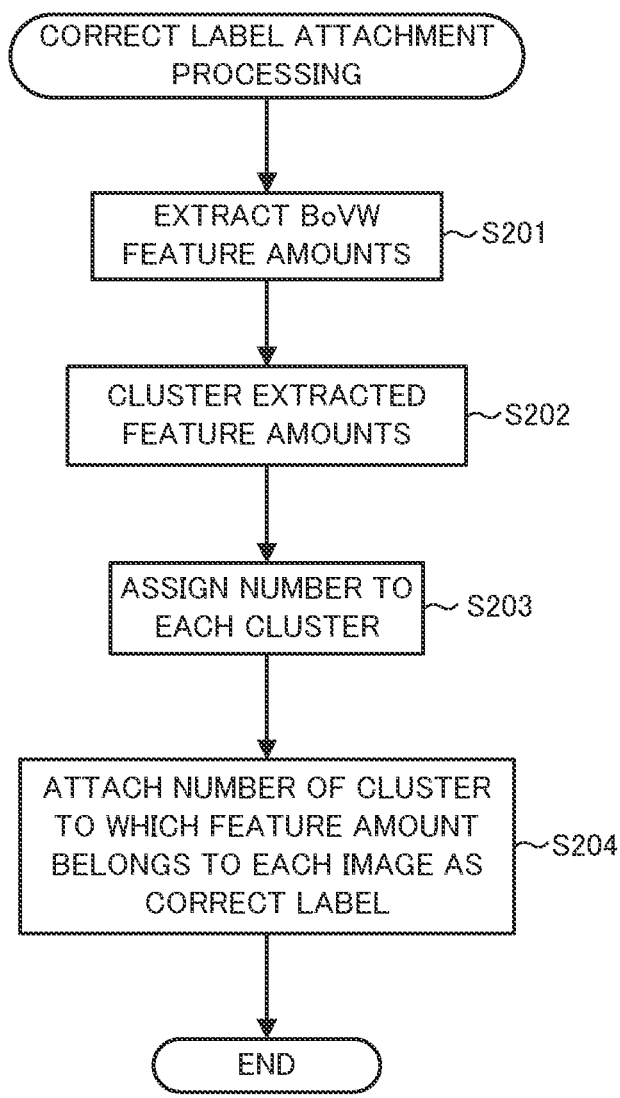
FIG. 7 is a flowchart of correct label attachment processing according to Embodiment 1

Next, the correct label attachment processing to be performed in step S102 for the training processing (FIG. 6) is described with reference to FIG. 7.

First, the controller 10 extracts the feature amount from each of the image data for training with use of the BoVW (step S201). Next, the label attacher 13 clusters the feature amounts extracted from all of the image data for training through use of the k-means approach (step S202). When clustering, the number of clusters may be freely selected (32 for example).

Next, the label attacher 13 assigns a number to each of the clusters generated by clustering in step S202 (step S203). For example, if in the clustering, 32 clusters are produced, then each cluster is assigned a number from 1 to 32. Number assignment may be performed in any manner as long as each cluster has its own unique number.

Next, the label attacher 13 attaches the numbers, assigned to the clusters to which the feature amounts of the image data belong, to the corresponding image data for training, as the second correct label (step S204). The correct label attachment processing ends upon completion of this step.

Here, although the BoVW was used as the feature amount of the image, any feature amount may be used as long as it is a feature amount into which the degree of similarity in appearance of images is reflected. Also, although the k-means approach is used as a method of clustering, the k-means approach does not need to be used. Any method of clustering may be used as long as clustering is performed such that similar feature amounts are to be grouped together in the same cluster while dissimilar feature amounts are grouped in different clusters.

Figure 8:
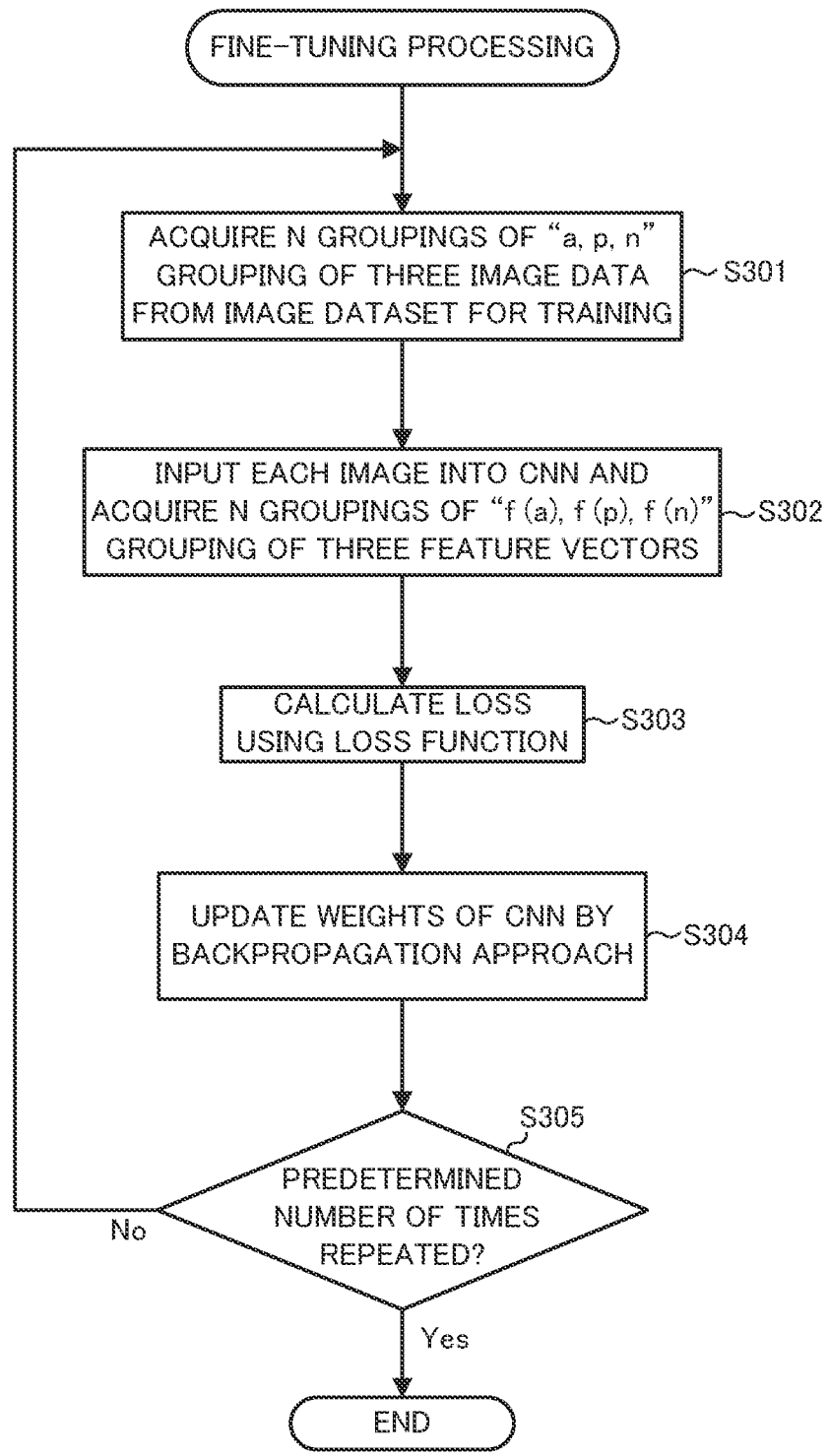
FIG. 8 is a flowchart of fine-tuning processing according to Embodiment 1.

Next, the fine-tuning processing performed in step S104 of the training processing (FIG. 6) is described with reference to FIG. 8. This processing is processing performing degree-of-similarity training with use of the triplet network.

First, the fine-tuner 15 acquires N groupings (N is a freely-selected number) of three data from the image dataset for training (step S301). These three data are a baseline image data (anchor image data), an image data (positive image data) attached with the same first correct label as the anchor image data, and an image data (negative image data) attached with a first correct label that is different from the first correct label that is attached to the anchor image data. In step S301, first, the anchor image data (first image) is randomly selected from the image dataset for training and then, with respect to the selected anchor image data, a single positive image data (second image) and a single negative image data (third image) are randomly selected from the image dataset for training. Processing for acquiring a grouping of three image data (anchor, positive, and negative) is repeated in this manner N times.

Next, the fine-tuner 15 inputs each of the acquired image data into the CNN of the classifier 11 and acquires the feature vector from the output layer 118 (step S302). That is, the fine-tuner 15 acquires a first feature vector from the anchor image data (first image), a second feature vector from the positive image data (second image), and a third feature vector from the negative image data (third image). Since the grouping of the three image data acquired in step S301 is N grouping, by letting the grouping of the i-th grouping of three image data be expressed as "$a_i, p_i, n_i$", and letting the function that obtains the feature vector from the image data be expressed as f, in step S302, N groupings of the three feature vectors "$f(a_i), f(p_i), (f(n_i)$" (i=1 to N) are obtained.

Next, the fine-tuner 15 calculates the loss L using the loss function (Triplet Loss) of the following Formula (1) (step S303).

$$L = \Sigma_{i=1,N} \max(0, (\|f(a_i)-f(p_i)\|^2 - \|f(a_i)-f(n_i)\|^2 + \alpha)) \qquad (1)$$

where $\Sigma_{i=1, N}$ expresses the sum of when 1 to N are inserted into i in the formula that follows after $\Sigma_{i=1, N}$, max expresses the maximum value of the parameter, $\|f(a_i)-f(p_i)\|^2$ expresses a square of L2 norm of the vector expressed by $f(a_i)-f(p_i)$, and $\|f(a_i)-(f(n_i)\|^2$ expresses a square of the L2 norm of the vector expressed by $f(a_i)-f(n_i)$. Also, $\alpha$ is a parameter for setting the distance (L2 norm) between the feature vector of the anchor image data and the feature vector of the negative image data to be farther than the distance (L2 norm) between the feature vector of the anchor image data and the feature vector of the positive image data by no less than $\alpha$, and $\alpha$ is to be set as a predetermined number (0.2, for example).

Next, the fine-tuner 15, uses the loss L, obtained in step S303, with the backpropagation approach, updating the weight coefficients of the CNN of the classifier 11 such that the value of loss L gets smaller (step S304). By updating the weight coefficients of the CNN of the classifier 11 in this manner, the training state of the classifier 11 trained by the main trainer 14 gets fine-tuned. Next, the fine-tuner 15 determines whether or not the steps S301 to S304 were repeated a predetermined number of times (five times, for example) (step S305).

If these steps were not repeated the predetermined number of times (NO in step S305), then processing returns to step S301. Conversely, if these steps were repeated the predetermined number of times (YES in step S305), then fine-tuning processing ends. In the fine-tuning processing, by calculating the loss L using the aforementioned loss function, the degree of similarity of the feature vectors between the images (images to which the same first correct label is attached) belonging to the same class is higher, whereas the degree of similarity of the feature vectors between the images (images to which different first correct labels are attached) belonging to different classes is lower.

Through the training processing, the correct label attachment processing, and the fine-tuning processing described above, the CNN of the classifier 11 is trained such that feature vectors to be output when the image data are inputted are similar to each other in a case where the image data have a high degree of similarity in appearance (due to the main trainer 14) or in a case where the images have the same first correct label that is a correct label attached to the image data for training (due to the fine-tuner 15).

Figure 9:
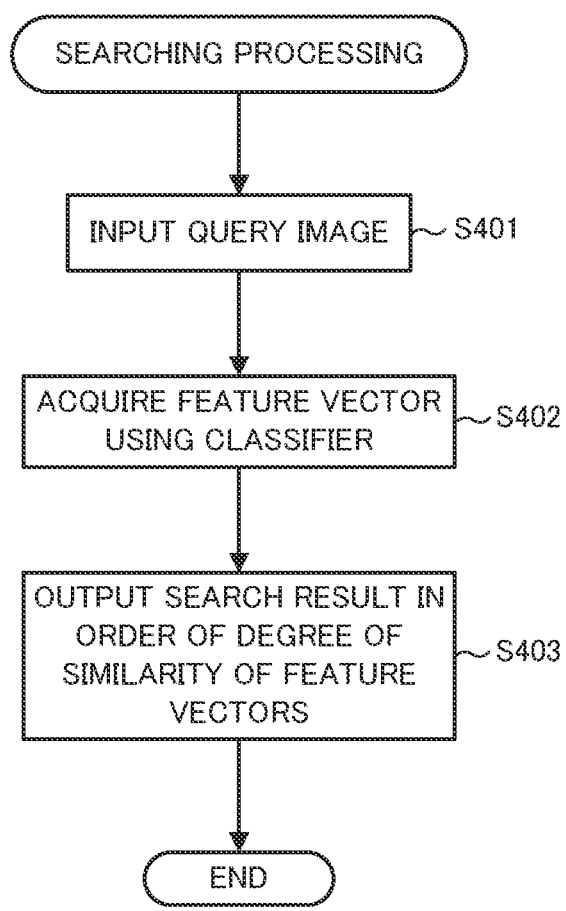
FIG. 9 is a flowchart of searching processing according to Embodiment 1.

Next, searching processing for performing image searching with use of the CNN of the classifier 11 trained in this manner is described with reference to FIG. 9. This searching processing starts when the image searching apparatus 100 receives an instruction from the user via the operation inputter 34 to start the searching processing.

First, the searcher 16 receives, via the image inputter 31, an input of a query image from the user (step S401). Next, the searcher 16 inputs the query image into the CNN of the classifier 11 and acquires a feature vector of the query image from the output layer 118 of the CNN (step S402).

Then, for every image data included in the image dataset for searching, the searcher 16 obtains a degree of similarity between the feature vector that is attached to each image data included in the image dataset for searching and the feature vector acquired in step S402 and outputs a predetermined number of the image data for searching in descending order of the degree of similarity to the outputter 32 (step S403). After completion of this step, the searching processing ends. When the image data for searching is to be output, the degree of similarity between the query image and each of the image data for searching may be outputted together with the image data for searching to the outputter 32.

The CNN of the classifier 11 is trained such that the feature vectors are similar to each other between not only the images of image data for searching to which the same first correct label is attached but also between the images (images similar to each other in appearance) attached, by the label attacher 13, with the same second correct label. Therefore, by performing the aforementioned searching processing, the images (images classified into the same class as the query image) similar to the query image from the standpoint of the first correct label that is attached to the image data for training and the images (images similar in appearance with the query image) classified into the cluster of the second correct label attached by the label attacher 13, among the image data for training to which feature vectors having a high degree of similarity with the feature vector of the query image inputted into the classifier 11 are attached, are both outputted in the upper ranking of the search results. Therefore, the image searching apparatus 100 can search for not only images that are classified into the same class but also images that are similar to each other in appearance. The expression "similar to the query image from the standpoint of the first correct label" means the feature vector of the acquired query image and the feature vector of the target image are similar in a case where the feature vector of the query image and the feature vector of the target image are acquired by use of the classifier 11 trained by using the training data to which the first correct label is attached.

Modified Example 1

In the aforementioned Embodiment, the main trainer 14 trains the CNN of the classifier 11 based on the second correct label attached by the label attacher 13 to the image data for training. However, the correct label to be used for training the CNN of the classifier 11 is not limited to the second correct label. For example, the CNN of the classifier 11 may be trained based on the first correct label that is originally attached to the image data for training. Modified Example 1 as such is described below. Simply put, Modified Example 1 is an embodiment in which the correct label to be used by the main trainer 14 for training and the correct label to be used by the fine-tuner 15 during fine-tuning are opposite to those Embodiment 1.

The main trainer 14 of Modified Example 1 trains the CNN of the classifier 11 by using the image data for training to which the first correct labels are attached. Specifically, if the target of the search by the image searching apparatus 100 is, for example, images of skin diseases, then the image data for training to which the skin disease names are attached as the first correct labels are used to train the CNN of the classifier 11. Also, if the target of the search is, for example, images of flowers, then the image data for training to which the names of the flowers are attached as the first correct labels are used to train the CNN of the classifier 11.

When this training (main training) is to be performed, the main trainer 14 sets, in advance, the number of classes (number of dimensions of the output vector) to be output by the output layer 118 of the CNN of the classifier 11 to match with the number of classes (number of disease names or names of flowers (first correct label) into which classification is performed by the classifier 11; for example 8) to be used with the image dataset for training. Then, the main trainer 14 trains the CNN of the classifier 11 by updating the weight coefficients in the CNN of the classifier 11, through use of the backpropagation approach, based on the error between (i) the output values that are output from the output layer 118 when the image data for pre-training is inputted into the input layer 111 of the CNN and (ii) the first correct labels.

The fine-tuner 15 of Modified Example 1 uses the image data for training, to which the second correct labels are attached by the label attacher 13, to fine-tune the training state (weight coefficients in the CNN) of the CNN of the classifier 11 trained by the main trainer 14. This fine-tuning, as described in Embodiment 1, is performed by degree-of-similarity training with use of the triplet network. Also, when this fin-tuning is to be performed, the fine-tuner 15 sets, in advance, the number of dimensions of the output vector to be output by the output layer 118 of the CNN of the classifier 11 to match with the number of dimensions of the feature vector (256 dimensions, for example) to be used for similar image searching.

With exception to that which is described directly above, Modified Example 1 is the same as Embodiment 1. Also, the training processing, the correct label attachment processing, the searching processing, and the like can be processed similarly to those in Embodiment 1. The correct label attachment processing may be performed after the main training. In Modified Example 1, the CNN of the classifier 11 is trained such that the feature vectors are similar to each other between not only the images of image data for searching to which the same first correct label is attached but also between the images (images similar to each other in appearance) attached, by the label attacher 13, with the same second correct label. Therefore, by performing the searching processing, the images (images classified into the same class as the query image) similar to the query image from the standpoint of the first label that is attached to the image data for training and the images (images similar in appearance with the query image) classified into the cluster of the second correct label attached by the label attacher 13 are both outputted in the upper ranking of the search results. Therefore, the image searching apparatus 100 of Modified Example 1 can search for not only images that are classified into the same class but also images that are similar to each other in appearance.

Modified Example 2

In Embodiment 1 and Modified Example 1, the label attacher 13 attaches, to the image data for training, the second correct labels based on the degree of similarity in appearance between the images using the BoVW. However, it is not necessary to limit the standpoint of the second correct labels to the degree of similarity in appearance between images. For example, the image dataset for training may be clustered based on a degree of similarity from some kind of standpoint such as a degree of similarity in color, a degree of similarity in brightness, or degree of similarity in frequency component, and each image data for training may be attached with the second correct label. Modified Example 2 is taken to be such an embodiment.

For example, when performing an operation such as searching for a design of wallpaper for a room or searching for a design of clothing, the user may desire to search for a design that is similar to a design specified by the user from the standpoint of warm color types/dark color types, for example, instead of from the standpoint of the first correct labels originally attached to the image data for training. In such a case, the label attacher 13 of Modified Example 2 may attach the second correct labels to the image data for training based on the degree of similarity in color.

In doing so, the image searching apparatus 100 of Modified Example 2 can search for not only images that are classified into the same class but also images that are similar to each other from a predetermined standpoint (standpoint of degree of similarity in color, for example).

Modified Example 3

In the aforementioned Embodiment 1 and the modified examples, although the label attacher 13 attaches, to each image data for training, only the first correct label (second correct label), correct labels may be attached based on multiple standpoints. For example, it is conceivable to attach to each of the image data for training, a correct label (second correct label) based on the degree of similarity in appearance, a correct label (third correct label) based on the degree of similarity in color, and/or a correct label (fourth correct label) based on the degree of similarity in brightness. Modified Example 3 is taken to be such an embodiment.

The main trainer 14 of Modified Example 3 trains the CNN of the classifier 11 by using one of these correct labels. Then, the fine-tuner 15 of Modified Example 3 repeats the fine-tuning processing (number of types of correct labels—1) times, using the next the correct label yet to be used by the main trainer 14 and continues doing so until all of the correct labels have been used.

In doing so, the image searching apparatus 100 of Modified Example 3 can search for not only the images that are classified into the same class but also images that are similar to each other from various standpoints (multiple standpoints such as the degree of similarity in appearance and the degree of similarity in color, for example).

Modified Example 4

Although Triplet Loss is used as the loss function in the fine-tuning processing in the aforementioned embodiment and modified examples, the loss function is not limited to Triplet Loss. For example, Contrastive Loss may be used as the loss function. Modified Example 4 is taken to be an embodiment in which Contrastive Loss is used as the loss function.

Figure 10:
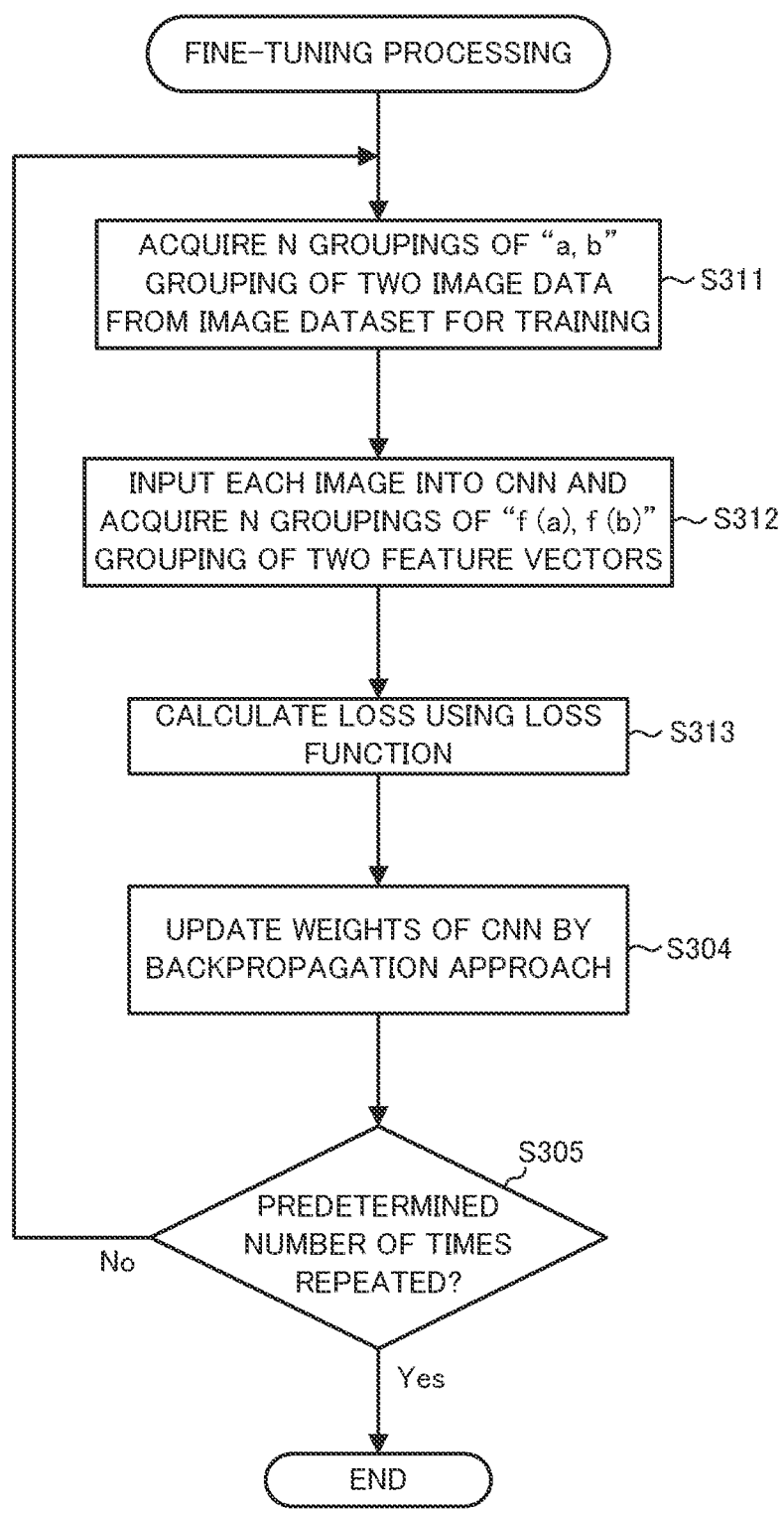
FIG. 10 is a flowchart of fine-tuning processing according to Modified Example 4.

Fine-tuning processing in Modified Example 4 is described with reference to FIG. 10. In this processing, the steps S301 to S303 of the fine-tuning processing (FIG. 8) of Embodiment 1 are replaced with steps S311 to S313. In Modified Example 4, the fine-tuning processing is the processing that is called in step S104 of the training processing (FIG. 6) in Embodiment 1.

First, the fine-tuner 15 acquires N groupings (N is a freely-selected number) of a grouping of two image data from the image dataset for training (step S311). These two image data are two image data freely-selected from the image dataset for training. Here, it is taken that these two image data are image data a (first image) and image data b (second image). In step S311, first, the image data a is randomly selected from the image dataset for training and then image data b, being data other than image data a, is randomly selected from the image dataset for training. In this manner, the processing for acquiring "a, b" grouping of the two image data is repeated N times.

Next, the fine-tuner 15 inputs each acquired image data into the CNN of the classifier 11 and acquires the feature vector from the output layer 118 (step S312). That is, the fine-tuner 15 acquires the first feature vector from image data a (first image) and the second feature vector from image data b (second image). Since the grouping of the two image data acquired in step S311 is N grouping, by letting the grouping of the i-th grouping of two image data be expressed as "$a_i$, $b_i$", and letting the function that obtains the feature vector from the image data be expressed as f, in step S312, N groupings of the two feature vectors "f ($a_i$), f ($b_i$)" (i=1 to N) are obtained.

Next, the fine-tuner 15 calculates the loss L using the loss function (Contrastive Loss) of the following Formula (2) (step S313).

$$L = \Sigma_{i=1,N}(yab(\|f(a_i)-f(b_i)\|^2)+(1-yab)\max((\alpha-\|f(a_i)-f(b_i)\|^2),0)) \quad (2)$$

Where $\Sigma_{i=1,N}$ expresses the sum of when 1 to N are inserted into i in the formula that follows after $\Sigma_{i=1,N}$. The notation yab assumes the value of 1 in a case where the first correct label that is attached to image data a and the first correct label that is attached to image data b are the same and assumes the value of 0 when these two labels are different from each other. Also, max expresses the maximum value of the parameter and $\|f(a_i)-f(b_i)\|^2$ expresses a square of L2 norm of the vector expressed by f ($a_i$)–f ($b_i$) (that is, a square of the distance between the first feature vector and the second feature vector). Also, $\alpha$ is a parameter for setting the feature vector of image data a and the feature vector of image data b to be separated by $\alpha$ in a case where the first correct label that is attached to image data a and the first correct label that is attached to image data b are different from each other, and $\alpha$ is to set to be as a predetermined number (0.2, for example).

After the processing of step S313, processing advances to step S304, but since the processing from step S304 is similar to the fine-tuning processing in Embodiment 1 described with reference to FIG. 8, the description for the similar processing is omitted here. By referring to $\|f(a_i)-f(b_i)\|$ when the first correct label that is attached to image data a and the first correct label that is attached to image data b are the same as the first distance and referring to $\|f(a_i)-f(b_i)\|$ when the first correct label that is attached to image data a and to image data b are different from one another as the second distance, and by calculating the loss L using the aforementioned loss function in the fine-tuning processing in Modified Example 4, the training state of the classifier 11 is fine-tuned such that the first distance is shorter than the second distance. Therefore, in the fine-tuning processing of Modified Example 4 as well, the degree of similarity of the feature vectors between the images (images to which the same first correct label is attached) belonging to the same class is higher, whereas the degree of similarity of the feature vectors between the images (images to which different first correct labels are attached) belonging to different classes is lower.

When the case where Triplet Loss is used as the loss function and the case where Contrastive Loss is used as the loss function are compared, Contrastive Loss has one advantage in that the computational load is small since two image data are used when calculating loss L. Conversely, since Triplet Loss relatively optimizes the positive pair (pair of the feature vector of the anchor image data and the feature vector of the positive image data) and the negative pair (pair of the feature vector of the anchor image data and the feature vector of the negative image data) instead of using three image data, it has one advantage in that it is easier to acquire feature vectors into which the degree of similarity between images are reflected since the distance between the feature vectors does not easily become 0 even for positive pairs.

The Contrastive Loss is a method that has conventionally been used and is shown to be somewhat effective in distance-based training. As a method for learning from feature amounts, there is also a method for setting the output of the intermediate layers of the CNN that has been trained for identification as the feature amounts but this method is problematic in that the degree of similarity between feature vectors cannot be learned. With respect to this, Triplet Loss and Contrastive Loss are beneficial in that they enable direct learning of the degree of similarity.

In the aforementioned embodiment and the modified examples, although the controller 10 is configured to also function as the classifier 11 by using the controller 10 to execute the program that realizes the CNN-based classifier 11, this is not limiting. The image searching apparatus 100 may include, in addition to the controller 10, a device that achieves the functions of the classifier 11 (a device such as a graphics processing unit (GPU) or a dedicated integrated circuit (IC), for example). Also, the classifier 11 may be based on a neural network (NN) other than the CNN (such as a recurrent neural network (RNN), for example).

In the aforementioned embodiment and the modified examples, only the output layer 118 of the CNN of the classifier 11 and the fully-connected connections 127 preceding immediately preceding the output layer 118 are described as being changed during pre-training, main training, and fine-tuning as illustrated in FIGS. 3, 4, and 5, but this is not limiting. In a case where the number of classes to be output by the output layer 118 may be the same, such changing is unnecessary. Also, in a case where the number of classes is different, although it is critical to change the output layer 118 and the fully-connected connections 127 immediately preceding the output layer 118, the feature map 117, the feature map 116, and the like that exist prior to the output layer 118 may also be changed together with the output layer 118 and the fully-connected connections 127.

The individual functions of the image searching apparatus 100 may also be executed by a computer such as an ordinary personal computer (PC). Specifically, in the aforementioned embodiment, the program for the training processing and the searching processing to be performed by the image searching apparatus 100 is described as being stored in advance in the ROM of the storage 20. However, the program may be stored in, and distributed through, a non-transitory computer-readable recording medium such as a flexible disk, a compact disc read-only memory (CD-ROM), a digital versatile disc (DVD), a magneto-optical disc (MO), a memory stick, or a universal serial bus (USB), and may be installed into a computer to enable the computer to achieve the above-described individual functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image searching apparatus comprising:
   a processor configured to perform image search by using a classifier, the classifier being trained through processes comprising:
   acquiring an image to which identification information of a subject included in the image is attached as a first correct label, the image being included in an image dataset for training and being an image for use in supervised training;
   attaching, to the image acquired in the acquiring, classification information based on a feature amount of the image as a second correct label;
   training the classifier using the image acquired in the acquiring and the second correct label attached in the attaching; and
   updating training content used in the training, using the image acquired in the acquiring and the first correct label, after training the classifier in the training.

2. The image searching apparatus according to claim 1, wherein:
   the classifier is a classifier using a convolutional neural network,
   the training includes training the classifier in weight coefficients in the convolutional neural network as the training content so as to reduce an error between an output result obtained when the image is inputted to the classifier and the second correct label, and
   the updating includes updating the weight coefficients in the training.

3. The image searching apparatus according to claim 2, wherein:
   the convolutional neural network includes a plurality of layers that include an input layer, an intermediate layer, and an output layer, and
   the weight coefficients define strength of interconnection between layers of the plurality of layers.

4. The image searching apparatus according to claim 1, wherein the attaching includes attaching, to the image acquired in the acquiring, classification information based on at least one of a bag of visual words (BOVW) of the image, a degree of similarity in color of the image, a degree of similarity in a brightness of the image, and a degree of similarity in a frequency component of the image.

5. A classifier training method comprising:
   acquiring an image to which identification information of a subject included in the image is attached as a first correct label, the image being included in an image dataset for training for use in supervised training,
   attaching, to the image acquired in the acquiring, classification information based on a feature amount of the image as a second correct label,
   training a classifier using the image acquired in the acquiring and the second correct label attached in the attaching, and
   updating training content used in the training, using the image acquired in the acquiring and the first correct label, after training the classifier in the training.

6. A non-transitory computer-readable recording medium storing a program, the program being executable to control a computer to perform image search using a classifier trained through processes comprising:
   acquiring an image to which identification information of a subject included in the image is attached as a first correct label, the image being included in an image dataset for training for use in supervised training;
   attaching, to the image acquired in the acquiring, classification information based on a feature amount of the image as a second correct label;
   training the classifier using the image acquired in the acquiring and the second correct label attached in the attaching; and
   updating training content used in the training, using the image acquired in the acquiring and the first correct label, after training the classifier in the training.

\* \* \* \* \*